United States Patent [19]

Adey et al.

[11] Patent Number: 5,778,823
[45] Date of Patent: Jul. 14, 1998

[54] METHOD OF RAISING FISH BY USE OF ALGAL TURF

[75] Inventors: Walter H. Adey, Gloucester, Va.; Richard Purgason, Sugar Land, Tex.

[73] Assignee: Aquatic BioEnhancement Systems, Sugar Land, Tex.

[21] Appl. No.: 741,126

[22] Filed: Oct. 31, 1996

[51] Int. Cl.$^6$ .................................................. A01K 61/00
[52] U.S. Cl. ........................................................ 119/215
[58] Field of Search ................................ 119/215, 216, 119/217, 221, 223, 224, 226, 230, 231

[56] References Cited

U.S. PATENT DOCUMENTS

| | | |
|---|---|---|
| 149,198 | 3/1874 | Clark . |
| 3,565,043 | 2/1971 | Carmouche . |
| 3,726,251 | 4/1973 | Fremont . |
| 3,916,832 | 11/1975 | Sweeney ............................ 119/2 |
| 4,093,546 | 6/1978 | Taborsky . |
| 4,144,840 | 3/1979 | Bubien . |
| 4,169,050 | 9/1979 | Serfling et al. . |
| 4,297,973 | 11/1981 | Knowles . |
| 4,333,263 | 6/1982 | Adey . |
| 4,488,508 | 12/1984 | Heideman ........................... 119/3 |
| 4,958,460 | 9/1990 | Nielson et al. ................... 47/1.4 |
| 4,966,096 | 10/1990 | Adey . |
| 5,040,486 | 8/1991 | Pack . |
| 5,046,451 | 9/1991 | Inslee et al. . |
| 5,097,795 | 3/1992 | Adey . |
| 5,176,100 | 1/1993 | Fujino . |
| 5,322,035 | 6/1994 | Hawes et al. . |
| 5,352,709 | 10/1994 | Tarrant et al. . |
| 5,591,341 | 1/1997 | Jensen ............................. 210/602 |

OTHER PUBLICATIONS

E. W. Becker, "Micro–Algae for Human and Animal Consumption", pp. 223–256.

Lincoln, et al. "Aquatic System for Fuel and Feed Production from livestock wastes", *J. Agric. Engng. Res.*, (1986) 33, pp. 159–269.

Adey, et al, *Dynamic Aquaria –Building Living Ecosystems*, Smithsonian Institution, Washington, D.C., pp. 221–246 and 279–369.

*Primary Examiner*—Thomas Price
*Attorney, Agent, or Firm*—Liddell, Sapp, Zivley, Hill & LaBoon, L.L.P.

[57] ABSTRACT

A method of producing mature fish using an algal turf as feedstock. The method consists of first growing an algal turf in a growth reservoir while subjecting the turf to an oscillatory water surge; severing the algal turf from its growing surface and transferring the severed algal turf to a second vessel containing young fish. In an optional embodiment, water enriched in oxygen may be removed from the growth reservoir and recycled to the second vessel. Further, at least a portion of the metabolic and respiratory waste products of the fish may be transferred to a growth reservoir containing algal turf.

37 Claims, 3 Drawing Sheets

METHOD OF RAISING FISH BY USE OF ALGAL TURF

SPECIFICATION

1. Field of the Invention

The invention relates to a cost efficient method of raising and enhancing the production of mature fish by use of algal turf.

2. Background of the Invention

The last decade has witnessed an increased interest in the use of plant aquaculture in commercial fish farms. To date, attention has been focused on the use of planktonic algae for use in such systems. A number of problems have prohibited the commercial use of planktonic algae in fish farming, however. First, planktonic algae is difficult to harvest. The microscopic size of such algae has thus severely limited its use. Second, planktonic algae is inherently dispersed in the water medium and is an inefficient bulk food supply for fish.

In recent years, attention has been directed to algal turfs. For instance, U.S. Pat. No. 4,333,263 describes the use of Algal Turf Scrubbing ("ATS") to remove carbon dioxide, nutrients and other pollutants from wastewater. U.S. Pat. Nos. 4,966,096 and 5,097,795 further describe equipment suitable for carrying out such functions. To date, no commercially viable method has been suggested for the use of algal turfs in fish farming.

SUMMARY OF THE INVENTION

The invention is directed to a novel method of raising and enhancing the production of mature fish. The method consists of growing in a first vessel—an algal growth reservoir—an algal turf subjected to an oscillatory water surge. Water, enriched in oxygen, and/or the algal turf is transferred to a second vessel containing young (larval) fish—the fish rearing tank. At least a portion of the metabolic and respiratory waste products of the fish, primarily ammonia and carbon dioxide, is transferred from the fish rearing tank to the algal turf growth reservoir. These steps are continuously repeated, when necessary, until the desired quantity and size of mature fish is obtained and isolated.

When transferred to the fish rearing tank, at least a portion of the algal turf is typically severed from its growing surface prior to transfer. In an alternative embodiment, the algal turf may be severed by the fish themselves; generally by transferring the algal turf, still attached to its growing surface, into the fish reservoir or, alternatively, by herding fish into the growth reservoir. Fish thereby sever the turf from its attached surface.

BRIEF DESCRIPTION OF THE DRAWINGS

FIG. I is a simplified flow-chart of the process of the invention.

FIG. II is a diagrammatic flow-chart of the process of the invention when an algal turf production vessel is employed.

Figure 1:
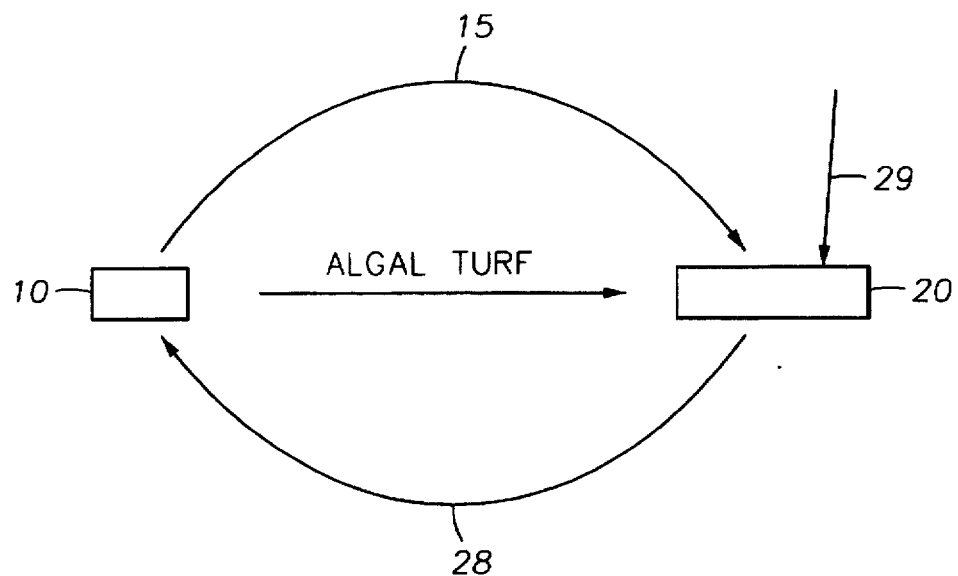
Figure 2:
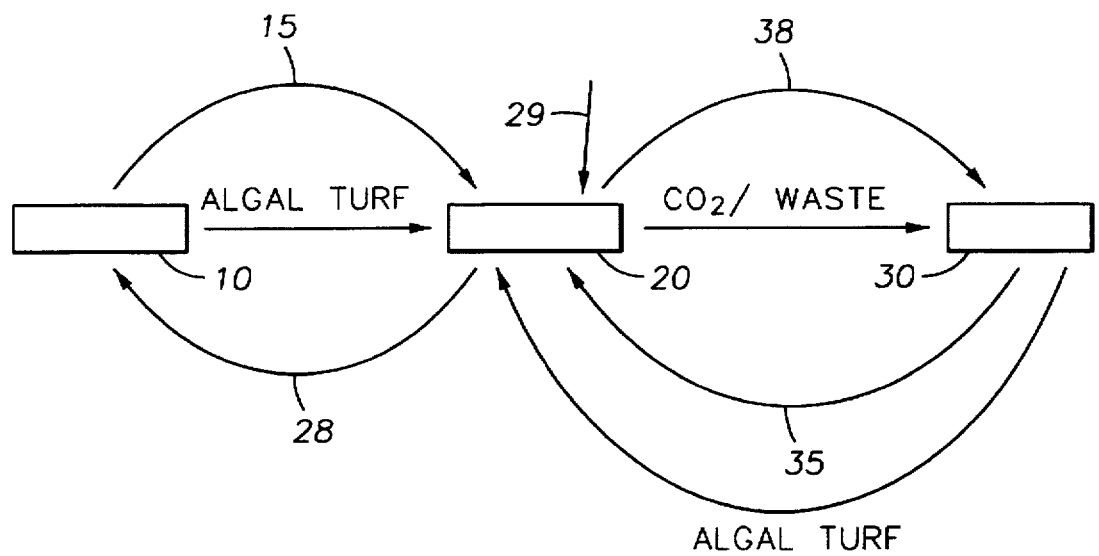
Figure 3:
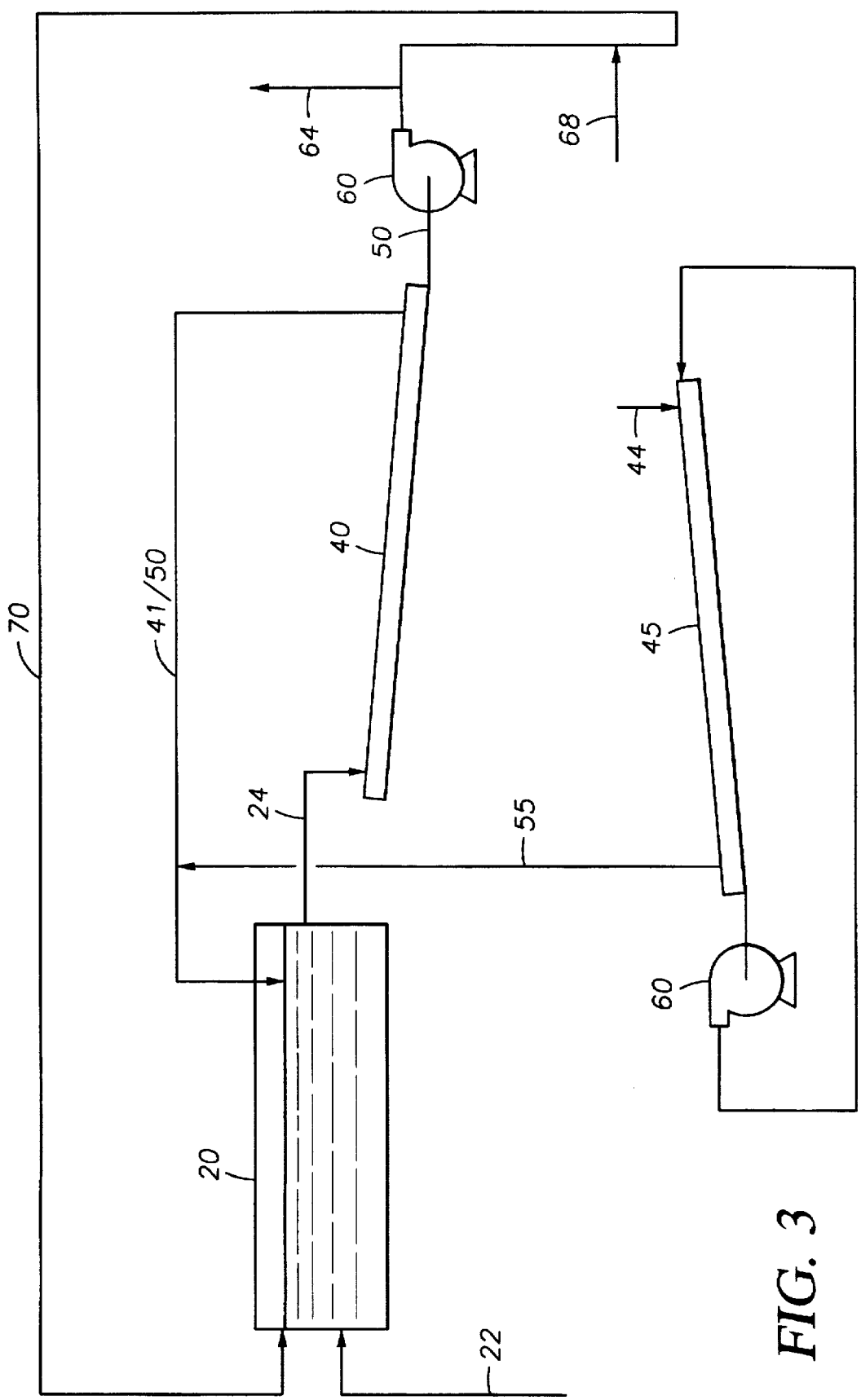
Figure 4:
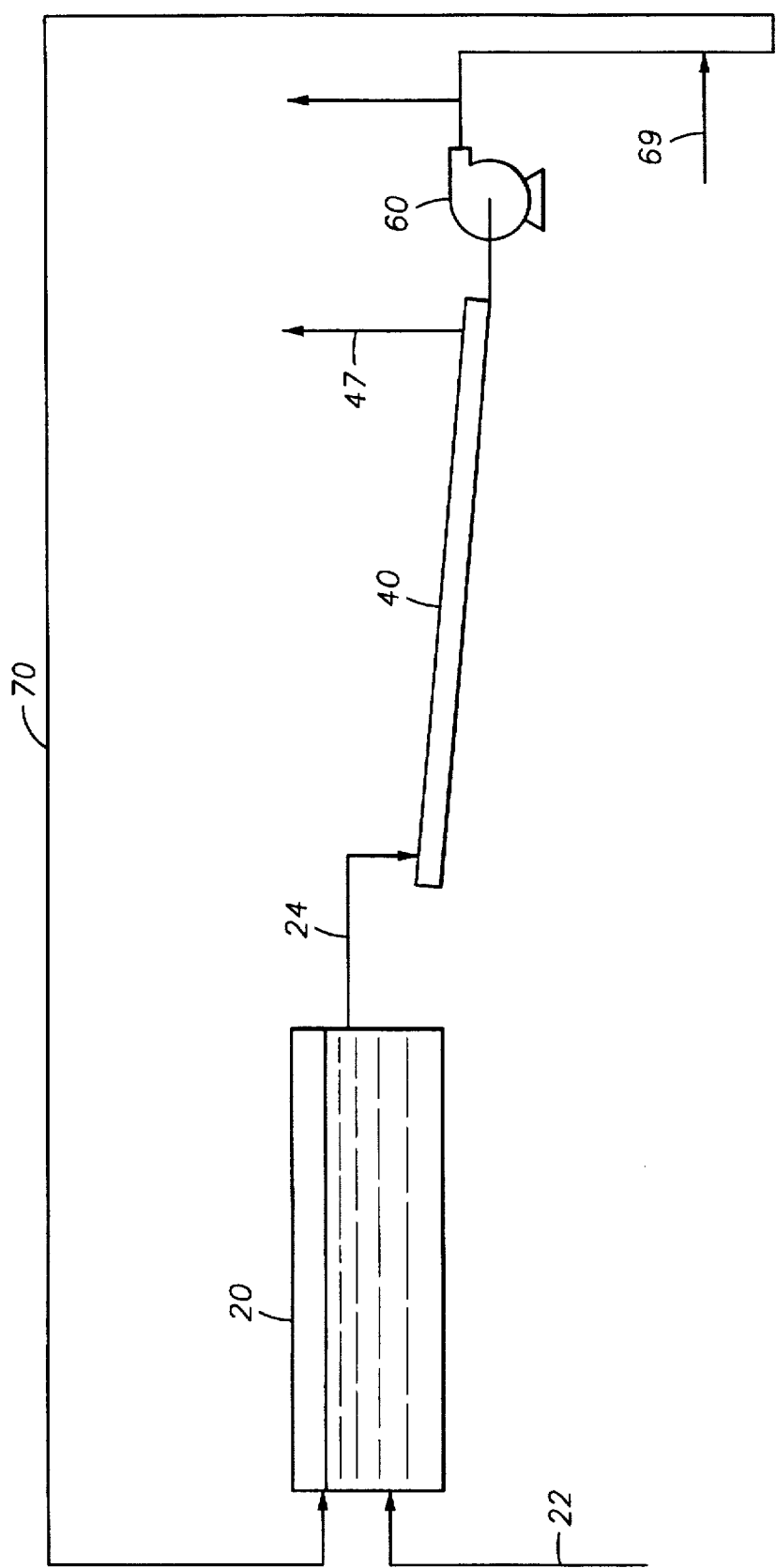

FIG. III is a more detailed flow-chart of the process of the invention wherein the algal turf within the growth reservoir is used as feedstock for the fish.

FIG. IV is a more detailed flow-chart of the process of the invention wherein the algal turf within the growth reservoir is not used as feedstock for the fish.

DETAILED DESCRIPTION OF PREFERRED EMBODIMENT

The process of the invention consists of raising edible fish from a feedstock comprising algal turf. The term "fish" is used in its broadest sense to include mollusks and mussels, though the invention is particularly advantageous for use in connection with finfish such as Tilapia and the like. The term "algal turf" shall refer to a colony of attached microalgae and/or smaller macroalgae and/or spores of the microalgae or smaller macroalgae. The term "microalgae" refers to algae that are smaller than approximately 2 centimeters in height or length. The term "smaller macroalgae" refers to algae that are smaller than approximately 20 centimeters in height or length. Benthic microalgae or a colony dominated by such algae is often preferred.

The algal turf for use in the invention may be prepared by first subjecting an algal biomass or algal spores, in an aqueous system, to light. The spores are "seeded" over the growing surface of the reservoir. The algal turf is often severed before being overgrown by larger macroalgae.

Any algae which upon maturation renders an algal turf is suitable for use as the algal source in the invention. The algae may be periphytic algae (typically defined as algae which grows attached to submerged surfaces) as well as benthic algae (algae which grows on bottom surfaces). Such algae is commonly freshwater algae though salt water algae is also acceptable.

Preferred algae are of the Cyanophyceae, Bacillariophyceae and Chlorophyceae classes, preferably the genera set forth below:

Cyanophyceae

*Oscillatoria sp.*
*Oscillatoria subbrevis*
*Oscillatoria princeps*
*Anabena sp.*

Bacillariophyceae

*Navicula sp.*
*Nitzschia sp.*
*Cyclotella sp.*
*Fragillaria sp.*
*Melosira sp.*
*Melosira varians*
*Melosira indica*
*Amphipleura pellucida*
*Eunotia pectinalis*
*Cocconeis sp.*
*Amphora sp.*
*Placoneis sp.*
*Rhoikoneis sp.*
*Bacillaria sp.*
*Ctenophora sp.*
*Asterionelia sp.*
*Stauroneis sp.*
*Surirella sp.*

Chlorophyceae

*Chlorella sp.*
*Scenedesmus sp.*
*Closterium sp.* 1
*Chroococcus sp.*
*Selenastrum sp.*
*Enteromorpha clathrata*
*Enteromorpha micrococca*
*Cladophora sp.*
*Cladophora gracilis*
*Cladophora crispata*
*Ulothix aegualis*
*Ulothrix sp.*

*Stigeoclonium sp.*
*Stigeoclonium tenue*
*Spirogyra rivularis*
*Spyrogyra sp.*
*Tribonema sp.*
*Rhizoclonium sp.*
*Hydradictyon sp.*
*Microspora sp.*
*Pediastrum duplex*
*Dichotomosiphon tuberosus*
*Bangiophycidae*
*Compsopogon coeruleus*

Especially preferred are species of the genera Ulothrix, Cladophora, Enteromorpha, Oscillatoria, Navicula, Anabaena and Nitzschia.

Salt water genera may further be used in the production of algal turf for use in the invention. Generally, algae for use in the invention can be grouped into four major areas. They are:

Green Algae

Bryopsis
Derbesia
Smithsonia

Brown Algae

Sphacelaria
Giffordia

Red Algae

Jania
Amphiroa
Centroceras
Polysiphonia
Gelidiella
Ceramium
Herposiphonia
Lophosiphonia

Blue-Green Algae

Oscillatoria
Schizothrix
Calothrix
Microcoleus

In colder waters, algal turfs are formed by similar or related genera, such as:

Green Algae

Enteromorpha
Ulva
Chaetomorpha
Cladophora

Brown Algae

Ectocarpus
Giffordia
Scytosiphon

Red Algae

Acrochaetium
Ceramium
Polysiphonia

Blue-Green Algae

Oscillatoria
Calothrix

Diatoms

Licmophora
Melosira

The above listings are merely illustrative of some prominent classifications of algae for use in the invention. The more prominent algae, where salt genera are desired, are (1) Sphacelaria, (2) Cladophora, (3) Calothrix, (4) Herposiphonia, (5) Smithsonia and (6) Giffordia.

The algal turf for use in the invention may further be defined as dense mats of small anatomically simple algae, generally less than several centimeters in height, grown on an algal bed. The bed is typically a flat, mesh screen that provides an anchor and support for the growth of algae. The tissue production rate of such algal turfs is generally between about 5 to about 40 g dry weight per square meter per day. In a well-developed turf, algae typically absorb 0.3 to 5.0 g nitrogen per square meter of growing surface, though higher and lower levels are known.

Growth of algal turfs can be obtained in an aqueous environment by providing a suitable growing surface within a growth reservoir (typically an enclosed chamber) upon which the spores may settle. The first colonizations are usually microscopic diatoms and blue green algae (cyanobacteria) which are then rapidly dominated by species of the genera listed above. Such algae are principally freshwater algae.

The growth reservoir may be located outdoors or indoors. When located outdoors, it may be a man-made or naturally occurring lake or pond or channel. It may also be a tank or vat, especially when located indoors. The terms "reservoir" and "vessel" as used herein shall refer to man-made as well as naturally occurring receivers for aqueous systems.

The algal biomass grows in the presence of either artificial or natural lighting. When the growth reservoir is located outdoors, the light source is normally the sun. When located indoors, artificial light is used. Metal halide lighting is most efficient where artificial light is desired especially where the algae is nonshaded. Fluorescent lamps can further be used as an effective artificial light source. The algal turfs are most often lit for between about 12 to about 22 hours a day.

Algal turfs under lighted and turbulent conditions are further efficient scrubbers of carbon dioxide and other nutrients. In so doing, they consume carbon dioxide and bicarbonate ion while releasing oxygen. They further increase the pH of the aqueous system. Under low nutrient conditions, they can be used to fix nitrogen as well as phosphorus such that their effluents are low in ammonia and ammonium by-products. Thus, algal turf are capable of converting low oxygen, high carbon dioxide, high ammonium environments into high oxygen, low carbon dioxide and low ammonium containing aqueous effluents. Such effluents are most desirable in the raising of fish.

Assuming adequate light is provided, algal turf production is limited only by inadequate exchange of metabolites— oxygen, carbon dioxide and nutrients between the water and the cells of the attached algae.

The algae for use in the invention easily attaches to the upper side of growing surfaces. Suitable growing surfaces for the algal turfs may include screens as well as other well-known surfaces to which benthic algae can attach. Turf algae is preferably grown on fine-mesh plastic screens. Such screens may be produced by being stretched on a frame that fits into the bottom of the growth reservoir. A somewhat coarser polyethylene screen, which is considerably more durable, may alternatively be used. The grid dimensions of the screen are such that spores of algae are allowed to settle. Ideally, such dimensions are in the range of approximately 0.5 to 10 mm, typically around 5 mm. As recited below, such screens may be designed to be removed from the aqueous system. This permits harvesting of the algal turf by the fish subsequent to introduction of the screen into the fish rearing tank.

In addition to the use of screens, other growing surfaces can comprise, for example, any rough surface on which algae can grow.

Essential growth requirements for the algal turf, in addition to an adequate lighting source, include aeration and agitation of the water in order to distribute nutrients and to remove any waste products generated.

Algal growth is random on the growing surface while wave action passes across and through the turf and enhances metabolite cellular-ambient water exchange. Wave surge dramatically increases algal production and thus photosynthesis. The net result of this increased photosynthesis and algal production is increased oxygen production and carbon dioxide removal. Wave surge action further enhances the exchange of metabolites between algal cells and the water media. The surge generated by the wave action produces a back and forth motion within the growth reservoir, preventing the development of semistagnant boundary layers that occur when a constant flow of liquid passes by a fixed object. (Steady currents tend to pin the filaments in an immobile position and a surface layer of very slow-moving water develops.)

By optimizing such metabolite cellular-ambient water exchange, continuous shading of one cell by an adjacent cell is prevented. Thus, in a preferred embodiment, the algae is subjected to an oscillatory water surge.

Wave surge or oscillatory water motion can be obtained in a variety of ways, most notably by mechanical wave generators. Where the algal turf growth reservoir is a natural source, such as a pond, sufficient wave surge may be created by the natural turbulence within the water stream. Where the algal turf growth reservoir is man-made, methods of generating wave surge across the algal turf are various and well recognized in the art. See, for instance, the dump-bucket wave maker described in U.S. Pat. No. 4,333,263, herein incorporated by reference. There, water from a pump feeding into the growth reservoir is directed onto the wave generator which comprises a shallow bucket which pivots about its axis. As the bucket fills, the wave generator tips and rotates about its axis such as to cause wave action on the lower growing surface. The action of the wave generator is a function of input water volume and the size of the shallow bucket. An outlet is defined at the opposite end of the growth reservoir. The outlet may be an adjustable spillway to regulate the flow of water in accordance with the pump output.

Wave surge in growth reservoirs can further be generated by push boards and large pistons as well as by pneumatic wave drive systems, all of which are wellknown in the art. Among the wide variety of high efficiency continuous duty pumps available for moving water into tanks, an acceptable choice is the submersible centrifugal pump. In addition, relatively large diameter diaphragm pumps containing "flapper" valves and which alternate relatively slowly from a slight suction to a slight pressure can be employed. Some compressed-air-driven types for transferring corrosive slurries in the chemical and other industries further work quite well are and readily available.

To avoid oxygen depletion and waste buildup that occurs in intensive fish production, it is often desirable to employ an algal turf scrubber (ATS). The scrubber, which contains primarily algal turfs, is a separate unit, which may be installed in the growth reservoir. Suitable ATS are described in U.S. Pat. Nos. 4,333,263 and 4,966,096, herein incorporated by reference. ATS produce oxygen during periods when the turf is exposed to light and remove ammonia whether lit or not. To take advantage of oxygen produced during daylight hours, a portion of the water passed across the algal turf during the day may be held aside for delivery during darkness. In this manner, ATS may act as the sole oxygen supply for fish.

The scrubber is effective in full-salt, brackish and freshwater systems. In effect, the scrubber keeps oxygen near or above the saturation point. The scrubber is most preferably used in conjunction with a means to provide wave surge motion. (In the absence of such a means, a greater surface area is required for algal growth to produce an adequate rate of oxygen production and nutrient uptake.)

Algal turf scrubbers are designed to produce the highest rate of plant production. Typically, shallow troughs create optimal conditions for light and wave surge. Pumps deliver water to the scrubber trough at a rate ranging from about 3 to about 20 gallons a minute per foot of scrubber width. At the other end of the trough, water returns to a reservoir through gravity drain pipes which can be used to supply the wave generator.

Ideally, the pH of the water within the growth reservoir is maintained from about 6.5 to about 10.5, preferably from about 7.5 to about 9.0. Where a more acidic environment is desired, the pH can be lowered by acidifying or bubbling with carbon dioxide. Addition of tannin to the water supply can also be used to foster acidic pH conditions. The pH can also be adjusted by varying water surge rate and intensity, such as by using a dump scrubber; see, for instance, U.S. Pat. No. 4,966,096, herein incorporated by reference.

The temperature of the water within the growth reservoir is best maintained between from about 0° C. to about 35° C., preferably between from about 25° C. to about 30° C.

Severing of (at least a portion of) the algal turf from its growing surface occurs before the turf becomes overgrown by macroalgae. This keeps production at acceptably high levels and prevents predation by grazing microorganisms. Immediate regrowth of the algal turf occurs if the surface or substrate is sufficiently coarse to allow a filamentous base of the algae to remain following severing. Severance frequency is a function of turf growth which should be monitored.

Where the growing surface for the algal turf is a screen, severing of the algal turf from its growing surface may be accomplished simply by use of plastic scraper, such as an automobile windshield ice scraper, or a sharp edge, such as a razor blade. This procedure mimics the grazing that the turfs have evolved to counteract. It also effectively removes nutrients from the entire system by collecting nitrogen, phosphorus and carbon that have become incorporated into the algal biomass.

Where the algal turf is to be transferred to the fish rearing tank, the algal turf may be harvested either prior or subsequent to transference. Where a screen is employed, the screen containing severed algal turf may be transferred directly from the algal turf growth reservoir to the fish rearing tank. Alternatively, the algal turf may be scraped from the screen with the plastic scraper or sharp edge prior to its transfer to the fish rearing tank. The screen may then be replaced within the algal turf growth reservoir. The basal filaments that remain, optionally intertwined in the mesh of the screen, after severance quickly sends new growth to replace what has been removed. Further, this severed algal turf can be harvested by use of a squeegee type device which breaks off the algal mat from the growing surface.

The period of growth and the subsequent need for harvesting, if any, are dependent on the many variables that determine the rate of growth of the algal turf, such as exposure to and intensity of the light, temperature, surge action of the wave, and hence, the flow rate of water across the growing surface, the size of the growing surface and the availability of nutrients. Each of these conditions may be varied to promote the growth of a particular species of algae or to improve the growth rate of all the algal colonies that may be established. Optimum harvesting interval generally ranges from about 7 to about 20 days.

The algal turf can be severed, and optionally harvested, by grazing of the fish or further by hand or utilizing machinery.

Prior to addition of the algal turf to the fish rearing tank containing the immature (larval) fish or fish eggs, at least a portion of the water may be removed from the severed algal biomass. The water may be removed by evaporation techniques well-known in the art. When desired, algal turf may be dewatered until it has a consistency of putty (such as toothpaste). The solids content of the severed algal biomass may be up to about 95 weight percent. Typically, the amount of solids content of the algal turf prior to entry into the fish rearing tank is between from about 8 to about 50 weight percent.

When so desired, the amount of algal turf fed daily to the fish rearing tank is from about 0.25 to about 6 percent of the estimated fish body weight. For Tilapia, the amount of algal turf fed daily into the fish rearing tank is from about 0.5 to about 4 percent of fish weight within the tank. The size and number of the tanks is not critical. However, since fish grow better in larger tanks and since it is easier to regulate stocking density in larger tanks, tanks holding at least about 100 gal of water are advantageously used.

A high density fish culture requires a high rate of oxygen supply. It is therefore essential that proper levels of oxygen be maintained within the fish rearing tank. In a preferred embodiment, natural resources are conserved by removing at least a portion of the water-enriched oxygen from the algal turf growth reservoir (and/or optionally algal turf production vessel) and recycling it to the fish rearing tank. Oxygen produced through the photosynthetic reaction of the algal turf in the water is thereby used directly in the fish rearing tank for the respiration of the fish. Algal turf scrubbers generally produce oxygen during periods when the turf is exposed to light. They remove ammonia irregardless of being lit or not. To take advantage of oxygen produced during daylight hours, a portion of the water passed across the algal turf during the day may be held aside for delivery during darkness. In this manner, the algal turf scrubber may act as the sole oxygen supply for fish. Alternatively, supplemental oxygen may be added in a variety of means well known in the art.

The temperature of the water in the fish rearing tank should be maintained at an optimum level for the species of fish involved. For Tilapia, for example, the optimum water temperature is between from about 75° F. to about 90° F.

Within the fish rearing tank, the ammonia concentration should be monitored regularly, preferably about every day and will vary among species. For Tilapia, for example, it should be maintained at less than 10.0 parts per million, and more preferably at less than about 5.0 parts per million.

In order to maximize the production of produced fish, it is most important to minimize the nitrite concentration. Nitrification of ammonia to nitrite by bacteria is rapid on the inside of pipe walls (generally on the order of 2–6 gN/m$^2$/day of pipe surface). Ammonia is readily made available in the waste water (optionally from urea and uric acid) as a major source of algal production. Minimizing nitrite concentration is most desirable in order to maximize ammonia uptake and algal production. Nitrite formation is best avoided by minimizing the amount of piping relative to the algal scrubbing surface. Where piping is essential to the production of the algal turf, alternate pipe lines are desirably used such that one pipeline may be cleaned while a second pipeline is in use. The formation of nitrites is thereby minimized. The nitrite concentration should be maintained below 1 part per million. The nitrate concentration should be maintained below about 200 to about 300 parts per million.

The pH of the water within the fish rearing tank should also be monitored regularly, about every day, and adjusted if necessary to maintain a pH between about 6.5 and about 8.5, and preferably about 7.0. If the pH is low, lime or some other non-toxic, water soluble alkaline substance should be added. If the pH is too high, hydrochloric acid or some other acid compatible with fish and plant life should be added.

At least a portion of the waste produced in the fish rearing tank may be transferred to the algal turf growth reservoir. Such wastes are principally carbon dioxide and ammonia. Carbon dioxide is used by the algal turf during production. Ammonia, the primary excretory product of fish, is a good nitrogen source for algal turf growth.

In an alternative embodiment of the invention, the waste from the fish rearing tank may be recycled to an algal turf production vessel distinct from the algal turf growth reservoir. This embodiment is normally employed where the algal turf growth reservoir is a naturally occurring lake, pond or channel; the algal turf production vessel being a man-made aqueous habitat having areas where spores of the respective algae can settle and provide an algal turf growth area. Algal turf from the algal turf production vessel, used as a feedstock for immature fish within the fish rearing tank, may be severed and optionally harvested in the manner described above. Growth of the algal turf within the algal turf production vessel is no different from growth of the algal turf in the algal growth reservoir and operates under the same conditions and parameters recited above for the algal turf growth reservoir.

The entire process of the invention may be conducted without the addition of salts or other chemical agents.

The process of the invention may further be run in a continuous mode. In this embodiment, waste and respiratory by-products from the fish rearing tank are recycled to the algal turf growth reservoir (and/or algal turf production vessel) to promote the growth of algal turf. The resulting algal turf is then fed, as described herein, to the fish rearing tank and the cycle repeats itself. A continual supply of mature fish may then be harvested.

The invention is diagrammatically depicted in FIG. I and FIG. II. In FIG. I, in growth reservoir 10, an algal turf is produced. The growth reservoir may be either man-made or a naturally occurring body of water. Once severed, the algal turf is introduced into fish rearing tank 20 which contains young (larva) fish. The fish consume the severed algal turf. Waste and respiratory products 28 produced in 20, especially carbon dioxide, ammonia and solid organic wastes rich in phosphorous, are recycled to growth reservoir 10 and used to produce algal turf. Products resulting from photosynthesis 15, including oxygen, carbohydrates, protein, phosphorus and other minerals may be introduced into 20 for consumption by the fish. As an alternative, fresh oxygen stream 29 may be introduced to tank 20 to ensure a requisite oxygen supply for the fish.

FIG. II is illustrative of a system wherein it is desired to employ an algal turf production vessel separate from an algal turf growth reservoir. Typically, this may occur in those circumstances where growth reservoir 10 is a naturally occurring water source. As set forth therein, the respiratory and waste products 38 from tank 20 are transferred to algal turf production vessel 30. If it is desired to continue to produce algal turf in growth reservoir 10, such waste and respiratory products may further be transferred to growth reservoir through 28. Photosynthesis products 35 of the resulting algal turf may then be transferred from vessel 30 to tank 20. The algal turf produced in vessel 30, once severed, is then passed to tank 20.

FIG. III is a detailed schematic of the method of the invention. Algal turf is produced in algal turf scrubber 40 such as that described in U.S. Pat. Nos. 4,333,263 and 4,966,096. Incoming aqueous streams of low oxygen, high carbon dioxide and high ammonium concentration is transferred in 40 to an effluent stream 50 high in oxygen. Algal turf 41 produced in 40, and optional effluent stream 50 is transferred to fish rearing tank 20. Such tanks may hold as much as 150,000 gallons of water. Typically about 0.7 to about 0.8 lb. of fish per gallon of water are within fish rearing tank 20. Water 22 is fed into tank 20. Waste and respiratory products 28 exit tank 20 as effluent stream 24. Stream 24 low in oxygen and high in carbon dioxide and ammonium enter algal turf scrubber 40.

A portion of effluent stream 50 further enters pump 60. A portion of the stream may be removed from the system at 64 for disposal. An oxygen stream is injected into the remainder of stream 50 at 68. Effluent stream enriched in oxygen 70 then enters fish rearing tank 20.

If needed, the amount of algal feed introduced to fish rearing tank 20 may be increased by use of (second) algal turf scrubber 45. Stream 44, rich in nutrients, enters the second algal turf scrubber. Algal turf produced in scrubber 45 renders algal feed 55 for addition to fish raising tank 20.

FIG. IV is illustrative of a pathway scheme for raising fish not algae fed. Algal turf discharged from scrubber 40 at 47 is subsequently used in other applications such as algal food sources for humans. The aqueous effluent from scrubber 40 may optionally be enriched by oxygen injector 69 prior to being recycled to fish rearing tank 20.

The invention will be more clearly illustrated with reference to the following examples.

EXAMPLE 1

A system schematic, demonstrated in FIG. 1, consists of fish rearing tank 20, algal turf scrubber 40 (consisting of harvester, growing surface, screen—either permanently or temporarily attached—surge generating device), circulation pump, and oxygen injection system (optional). The fish tank is of any manner of configuration and is well known in the art. The algal turf scrubber system consists of a slightly sloped growing surface made of a plastic liner material overlaid with a plastic screen which is permanently or temporarily attached to the liner. Water is moved through pipework connecting the fish tank and algal turf scrubber unit via a circulation pump. The fish tank is filled with water and the water moved through the system. Once water flow is established, the fish tank is seeded with a small quantity of young fish and the algal turf scrubber is seeded with algal spores. In the case of a Tilapia production facility, the sequence of design variables may be established in the following manner:

a) Assuming a daily growth rate of 1.5% and a desired annual production of 10,000 lb., the average standing crop may be established at 1826.5 lb. This translates into an oxygen consumption of approximately 15.4 lb/day (1826.5× 0.00841).

b) Assuming a feed conversation ratio of 1.7, the feed requirement is approximately 46.6 lb/day (1826.5×1.5×1.7/ 100), likely to yield about 1.4 lb/day (46.6×0.03) of nitrogen excreted into the water column.

The requirement for the algal turf scrubber is best determined by estimating the surface area required to remove the nitrogen. The algal turf scrubber within a fish culture system removes nitrogen at between 2 and 15 $mg/m^2/day/Langley$ (a unit of measure of solar radiation). Using a location with a minimum solar insulation of 400 Langleys, the surface area of the algal turf scrubber is 795 square meters (1.4× 1000×1000/(2×400×2.2)). Oxygen produced by the algal turf scrubber is approximately 38 $mg/m^2/day/Langley$. Thus the algal turf scrubber contributes a minimum of 26.6 lb. of oxygen (38×400×2.2×795/1,000,000). The algal turf produced is approximately equal in weight to the oxygen produced. Consequently, the optimal tradeoff of algal turf scrubber versus competing alternatives for management of each of feed, nitrogen and oxygen is easily determined.

A portion of oxygen-laden algal turf scrubber effluent produced during the day is stored for release to the fish at night. However, feeding times may be managed to minimize nocturnal oxygen consumption.

Algae may be harvested in one of several methods including:

Harvest Option 1:

The algal turf scrubber is constructed with a permanently attached screen or other rough surface suitable for holding attached algae. A harvester traverses the growth surface in a manner that severs the biomass with a squeegee-like or shaving manner. This may be performed with the water flowing or with water stopped. Algae is moved down the growth surface to the screen by action of the squeegee harvester or by movement of the water, if harvesting is performed with water flow. Harvested algae is separated from the water by a screen, such as by the gentle action of a wedgewire screen which may be oriented across the bottom edge of the growth surface or oriented within the stream of a collecting trough. At this point, the algae may be passively dewatered to a paste-like consistency and fed to the fish.

Harvest Option 2:

The algal turf scrubber is constructed with a screen upon which the algae grows—the screen held down to the plastic sheet in a temporary fashion such that the screen may be removed. The screen is weighted down such that it is held onto the plastic sheet in any number of ways, one of which is to place a heavy cable, usually lengthwise in the direction of slope. When it is time to harvest, the screen may be removed by lifting the weight that holds the screen down. The screen may then be pulled off the plastic liner and placed within the fish tank such that fish may graze the algae from the screen. Once harvested, the screen may be returned to the algal turf scrubber and the cycle repeated.

Harvest Option 3:

Fish are herded onto the algal turf scrubber unit and allowed to graze the algae. When the algae has been removed, the fish are herded off the growing surface and the algae allowed to regenerate.

It is obvious that the surface area may be enlarged or reduced depending upon the benefits desired. For instance, if more algae is required for fish feed, the surface may be enlarged and a nutrient source added to increase algal production. Alternatively, if fish feed is not necessary, for instance if a fish species is cultured which does not eat algae, then the surface area need not be increased for algal production. Furthermore, supplemental oxygen addition or supplemental nitrogen removal may be added (by systems well known in the art) if ATS surface area is less than that calculated above.

Changes may be made in the nature, composition, operation and arrangement of the various elements, steps and procedures described herein without departing from the spirit and scope of the invention as defined in the following claims.

What is claimed is:

1. A method of raising fish comprising:
   (a) transferring algal turf, severed from the growing surface of an algal turf growth reservoir, to a fish rearing tank prior to the algal turf being overgrown by macroalgae;
   (B) exposing young fish in the fish rearing tank to the severed algal turf for consumption of at least a portion of the severed algal turf by the fish;
   (C) removing water enriched in oxygen from the algal turf growth reservoir and recycling it to the fish rearing tank;
   (D) transferring at least a portion of the metabolic and respiratory waste products of the fish to the algal turf growth reservoir; and
   (E) repeating steps (A), (B), (C) and (D) until obtaining mature fish in the fish rearing tank; and
   (F) harvesting mature fish from the fish rearing tank.

2. The method of claim 1 wherein the severed algal turf is harvested from its growing surface prior to step (A).

3. The method of claim 1 wherein the severed algal turf is harvested from its growing surface subsequent to step (A).

4. The method of claim 1 wherein the algal turf within the algal turf growth reservoir is subjected to an oscillatory water surge.

5. The method of claim 1 wherein the growing surface for the algal turf in the algal turf growth reservoir is a screen.

6. The method of claim 1 wherein the algal turf severed from the growing surface of the algal turf reservoir is of the genera Ulothrix, Cladophora, Enteromorpha, Oscillatoria, Navicula, Anabaena or Nitzschia.

7. A method of raising mature fish comprising:
   (A) providing a growth reservoir for an algal turf wherein the growing surface for the algal turf is in contact with water and the algal turf is attached to the upper side of the growing surface and creating an oscillatory water surge across the algal turf;
   (B) severing at least a portion of the algal turf from the growing surface;
   (C) transferring the severed algal turf to a fish rearing tank containing young fish for consumption of at least a portion of the transferred algal turf by the fish;
   (D) removing water enriched in oxygen from the growth reservoir and recycling it to the fish rearing tank;
   (E) transferring at least a portion of the metabolic and respiratory waste products from the fish rearing tank to the growth reservoir containing the algal turf;
   (F) continuously repeating steps (B) through (E) until obtaining mature fish in the fish rearing tank; and
   (G) harvesting mature fish from the fish rearing tank.

8. The method of claim 7 wherein the algal turf is harvested from the growing surface prior to its introduction into the fish rearing tank.

9. The method of claim 7 wherein the growing surface for the algal turf is a screen.

10. The method of claim 7 wherein the water removed from the growth reservoir in step (D) is treated with free oxygen prior to its transfer to the fish rearing tank.

11. The method of claim 7 wherein the algal turf of step (A) is produced by introducing algal spores into the growth reservoir, providing a growing surface for said spores and subjecting the growing surface to light.

12. The method of claim 7 wherein the fish is Tilapia.

13. The method of claim 7 wherein the algal turf is of the genera Ulothrix, Cladophora, Enteromorpha, Oscillatoria, Navicula, Anabaena or Nitzschia.

14. A method of producing mature fish which comprises:
   (A) transferring algal turf from an algal turf growth reservoir to a fish rearing tank;
   (B) exposing young fish in the fish rearing tank to the transferred algal turf for consumption of at least a portion of the transferred algae by the fish;
   (C) optionally repeating steps (A) and (B) until mature fish are produced;
   (D) harvesting mature fish from the fish rearing tank.

15. The method of claim 14 which further comprises, prior to step (D), removing water enriched in oxygen from the algal turf growth reservoir and recycling it to the fish rearing tank.

16. The method of claim 14 which further comprises, prior to step (D), transferring at least a portion of the metabolic and respiratory fish waste products from the fish rearing tank to the algal turf growth reservoir.

17. The method of claim 14 wherein the algae is harvested from its growing surface prior to step (A).

18. The method of claim 14 wherein the algae is harvested from its growing surface subsequent to step (A).

19. The method of claim 14 wherein the algae produced in the algal turf growth reservoir is subjected to an oscillatory water surge.

20. The method of claim 14 wherein the growing surface for the algae in the algal turf growth reservoir is a screen.

21. The method of claim 14 wherein the algal turf is of the genera Ulothrix, Cladophora, Enteromorpha, Oscillatoria, Navicula, Anabaena or Nitzschia.

22. A method of producing mature fish which comprises:
   (A) providing a growing surface for an algal turf within a growth reservoir, wherein said growing surface is in contact with water;
   (B) subjecting said growing surface to light to grow the algal turf on said surface while subjecting the growing surface to water surge motion to promote metabolite cellular-ambient water exchange over it;
   (C) severing at least a portion of the algal turf from the growing surface;
   (D) transferring at least a portion of the algal turf to a fish rearing tank, containing young fish, for consumption of at least a portion of the algal turf by said fish;
   (E) transferring the waste produced by said fish in the fish rearing tank to an algal turf production vessel having a growing surface for algal turf;
   (F) subjecting the growing surface of the algal turf production vessel to light to grow said algal turf on said surface;
   (G) subjecting the algal turf of the algal turf production vessel to water surge motion to promote metabolite cellular-ambient water exchanges in the vessel;
   (H) transferring at least a portion of the algal turf from the algal turf production vessel to the fish rearing tank for consumption of at least a portion of the algal turf by said fish; and
   (K) continuously repeating step (E) through step (H) until obtaining mature fish in the fish rearing tank; and (L) harvesting mature fish from the fish rearing tank.

23. The method of claim 22 wherein at least a portion of the algal turf from the growth reservoir is harvested from its growing surface prior to its introduction into the fish rearing tank.

24. The method of claim 23 wherein at least a portion of the algal turf from the algal turf production vessel is harvested from its growing surface prior to its introduction into the fish rearing tank.

25. The method of claim 22 wherein at least a portion of the algal turf from the algal turf production vessel is harvested from its growing surface prior to its introduction into the fish rearing tank.

26. The method of claim 22 wherein the growing surface for the algal turf in the growth reservoir is a screen.

27. The method of claim 26 wherein the growing surface for the algal turf in the algal turf production vessel is a screen.

28. The method of claim 22 wherein the growing surface for the algal turf in the algal turf production vessel is a screen.

29. The method of claim 22 further comprising, subsequent to step (C) transferring from the growth reservoir water enriched in oxygen to the fish rearing tank.

30. The method of claim 22 further comprising, subsequent to step (G) transferring from the algal turf production vessel water enriched in oxygen to the fish rearing tank.

31. The method of claim 30 further comprising, subsequent to step (G) transferring from the growth reservoir water enriched in oxygen to the fish rearing tank.

32. The method of claim 22 wherein the algal turf transferred to the fish rearing tank in step (D) is of the genera Ulothrix, Cladophora, Enteromorpha, Oscillatoria, Navicula, Anabaena or Nitzschia.

33. The method of claim 22 wherein the fish is Tilapia.

34. A method of producing mature fish which comprises:
  (a) providing a growing surface for an algal turf within a growth reservoir, wherein said growing surface is in contact with water;
  (B) subjecting said growing surface to light to grow the algal turf on said surface;
  (C) transferring at least a portion of the water enriched in oxygen from the growth reservoir to a fish rearing tank, containing young fish, for metabolic interchange;
  (D) transferring at least a portion of the metabolic and respiratory waste products of the fish to the algal turf growth reservoir;
  (E) continuously repeating steps (B) through (D) until mature fish are obtained; and
  (F) harvesting mature fish from the fish rearing tank.

35. The method of claim 34 wherein the algal turf within the algal turf growth reservoir is subjected to an oscillatory water surge.

36. The method of claim 34 wherein the growing surface of the algal turf in the algal turf growth reservoir is a screen.

37. The method of claim 34 wherein the water removed from the growth reservoir in step (C) is treated with free oxygen prior to its transfer to the fish rearing tank.

* * * * *